United States Patent
Sato (10) Patent No.: US 7,174,095 B2
(45) Date of Patent: Feb. 6, 2007

(54) OPTICAL APPARATUS FOR OBSERVING OBJECT

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 159 days.

(21) Appl. No.: 10/933,414

(22) Filed: Sep. 3, 2004

(65) Prior Publication Data

US 2005/0053263 A1    Mar. 10, 2005

(30) Foreign Application Priority Data

Sep. 4, 2003    (JP)    ............................ P2003-312144

(51) Int. Cl.
G03B 17/18    (2006.01)
G02B 23/00    (2006.01)
G06F 17/30    (2006.01)

(52) U.S. Cl. ...................... 396/147; 396/287; 359/407; 707/1

(58) Field of Classification Search ................ 396/147, 396/287, 291; 348/333.03, 231.3, 231.2, 348/333.01; 356/3
See application file for complete search history.

(56) References Cited

U.S. PATENT DOCUMENTS

| | | | |
|---|---|---|---|
| 4,011,571 A * | 3/1977 | Okuzawa ...................... 396/291 |
| 4,717,933 A | 1/1988 | Ando et al. .................... 396/88 |
| 5,873,007 A * | 2/1999 | Ferrada Suarez ........... 396/296 |
| 6,833,866 B1 * | 12/2004 | Suzuki ..................... 348/231.2 |
| 2002/0039445 A1 | 4/2002 | Abe et al. ................... 382/199 |
| 2003/0063380 A1 | 4/2003 | Hirunuma et al. .......... 359/407 |

FOREIGN PATENT DOCUMENTS

| | | |
|---|---|---|
| JP | 7-56525 | 6/1995 |
| JP | 2001-101203 | 4/2001 |
| JP | 2003-107369 | 4/2003 |

OTHER PUBLICATIONS

English language Abstract of JP2003-107369.
U.S. Appl. No. 10/933,386 to Sato.

* cited by examiner

Primary Examiner—W. B. Perkey
(74) Attorney, Agent, or Firm—Greenblum & Bernstein, P.L.C.

(57) ABSTRACT

According to the present invention, an optical apparatus is provided that comprises a recording medium, a distance-detecting sensor, an illustrated-guide selector, and an image-indicating device. The recording medium stores illustrated-guide data for a plurality of illustrated guides. The distance-detecting sensor detects distance information relating to an observation target. The illustrated-guide selector selects one illustrated guide from the plurality of illustrated guides, in accordance with the distance information. The image-indicating device displays information of the illustrated-guide data.

12 Claims, 10 Drawing Sheets

FIG. 5 thrush. jpg
thrush. jpeg
thrush. wav
bulbul. jpg
bulbul. jpeg
bulbul. wav
. . . . .

FIG. 7 title. bmp season1. bmp season2. bmp season3. bmp season4. bmp area1. bmp area2. bmp area3. bmp size1. bmp size2. bmp size3. bmp

FIG. 8 title. bmp title. bmp season3. bmp season2. bmp area3. bmp area2. bmp size3. bmp size2. bmp

EXAMPLE OF IMAGES IN "GUIDE101" FOLDER

EXAMPLE OF IMAGES IN "GUIDE201" FOLDER

OPTICAL APPARATUS FOR OBSERVING OBJECT

BACKGROUND OF THE INVENTION

1. Field of the Invention

The present invention relates to an optical apparatus provided with an image indicating device, for observing an object.

2. Description of the Related Art

A digital binoculars is known as an example of an optical apparatus that is provided with a digital camera. The digital binoculars which can display and store images substantially the same as the images viewed through the binoculars is disclosed in Japanese unexamined patent publication (KO-KAI) No. 2003-107369.

SUMMARY OF THE INVENTION

An object of the present invention is to provide an optical apparatus (including digital camera) that can simply and swiftly indicate information relating to an observation target.

According to the present invention, an optical apparatus is provided that comprises a recording medium, a distance-detecting sensor, an illustrated-guide selector, and an image-indicating device.

The recording medium stores illustrated-guide data for a plurality of illustrated guides. The distance-detecting sensor detects distance information relating to an observation target. The illustrated-guide selector selects one illustrated guide from a plurality of illustrated guides, in accordance with the distance information. The image-indicating device displays information regarding the illustrated-guide data.

Further, according to a present invention, a recording medium is provided that comprises illustrated-guide data and priority information.

The illustrated-guide data corresponds to a plurality of illustrated guides. The priority information defines order of priority for selecting one of the plurality of illustrated guides, when the plurality of illustrated-guides is referred to.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
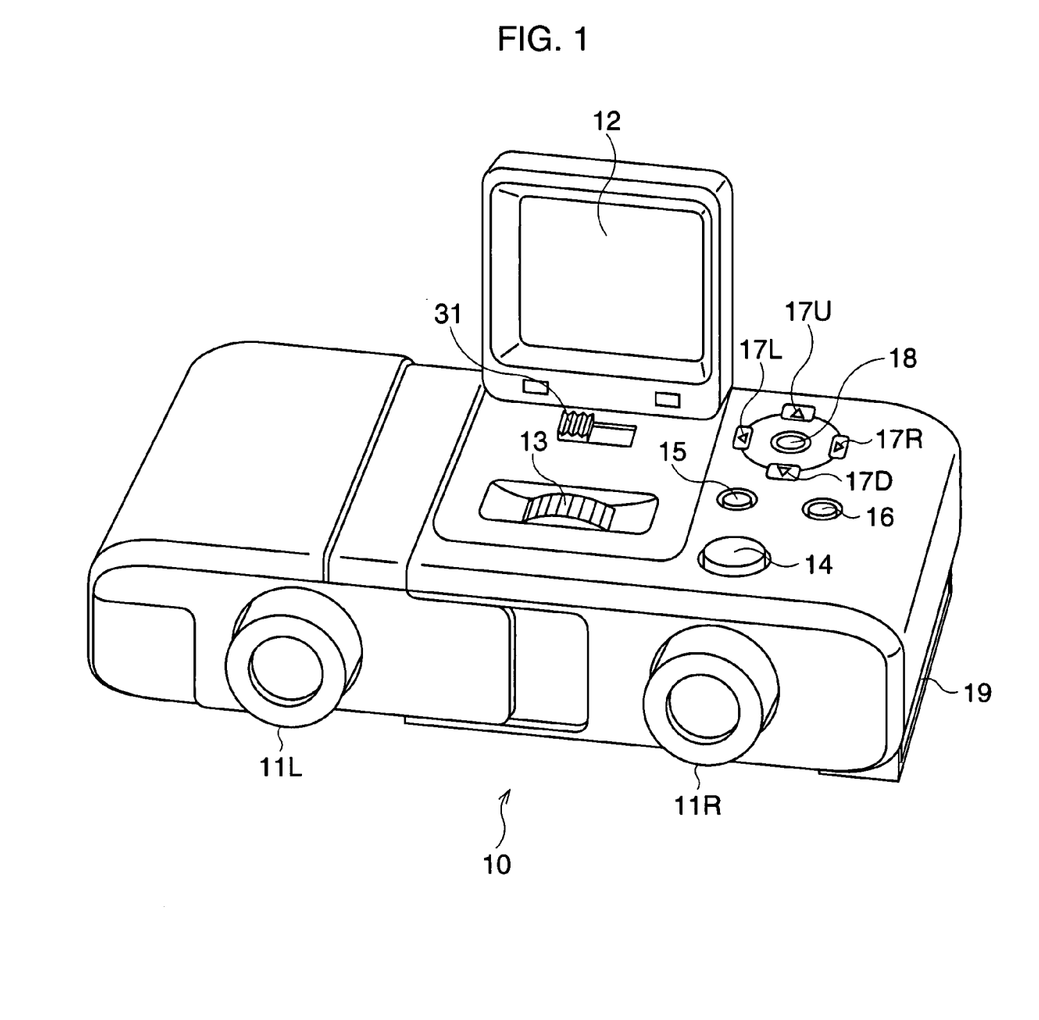
FIG. 1 is a perspective view of electronic binoculars in the first embodiment, viewed from the objective lens side.

FIG. 1 is a perspective view of a digital binoculars (digital camera provided binoculars) of a present embodiment, which is viewed from the ocular lens side (backside).

A pair of ocular units 11R and 11L is provided on the backside of the digital binoculars 10, and an image-indicating device 12, such as an LCD, is provided on top of the digital binoculars 10. In this example, the image-indicating device 12 is disposed about the center of the top surface. In front of the image-indicating device 12, at the side closer to the ocular units 11R and 11L than the image-indicating device 12, a focusing drive ring 13 for a focusing operation is arranged. The image-indicating device 12 is formed as a folding type panel and is rotatably fixed to the binoculars, along an axis parallel to the ridgeline formed by the top face and the front face. Namely, when the image-indicating device 12 is opened, the image-indicating device 12 is substantially erected with its screen facing the backside. Further, when the image-indicating device 12 is closed or folded, the image-indicating device 12 is laid down upon the top face of the casing. Note that, a focusing operation of an optical system for image capturing (not depicted) is associated with a focusing operation of the optical systems of the binoculars, including the ocular units 11L and 11R, and carried out by operating the focusing drive ring 13. Further, a macro-mode switch 31 is disposed between the focusing drive ring 13 and the image-indicating device 12.

As shown in FIG. 1, a release button 14 is provided on the right-hand side of the top face of the digital binoculars 10. On the front side of the release button 14, a menu button 15, a display button 16, four cursor keys 17U, 17D, 17R, and 17L, which correspond to respective up, down, right, and left directions, and an OK button 18, surrounded by the four cursor keys, are provided. Further, on a side of the digital binoculars 10, a card slot 19 into which a recording medium, such as an IC memory card, a magnetic disk, an optical disk, and the like, is inserted is formed.

Figure 2:
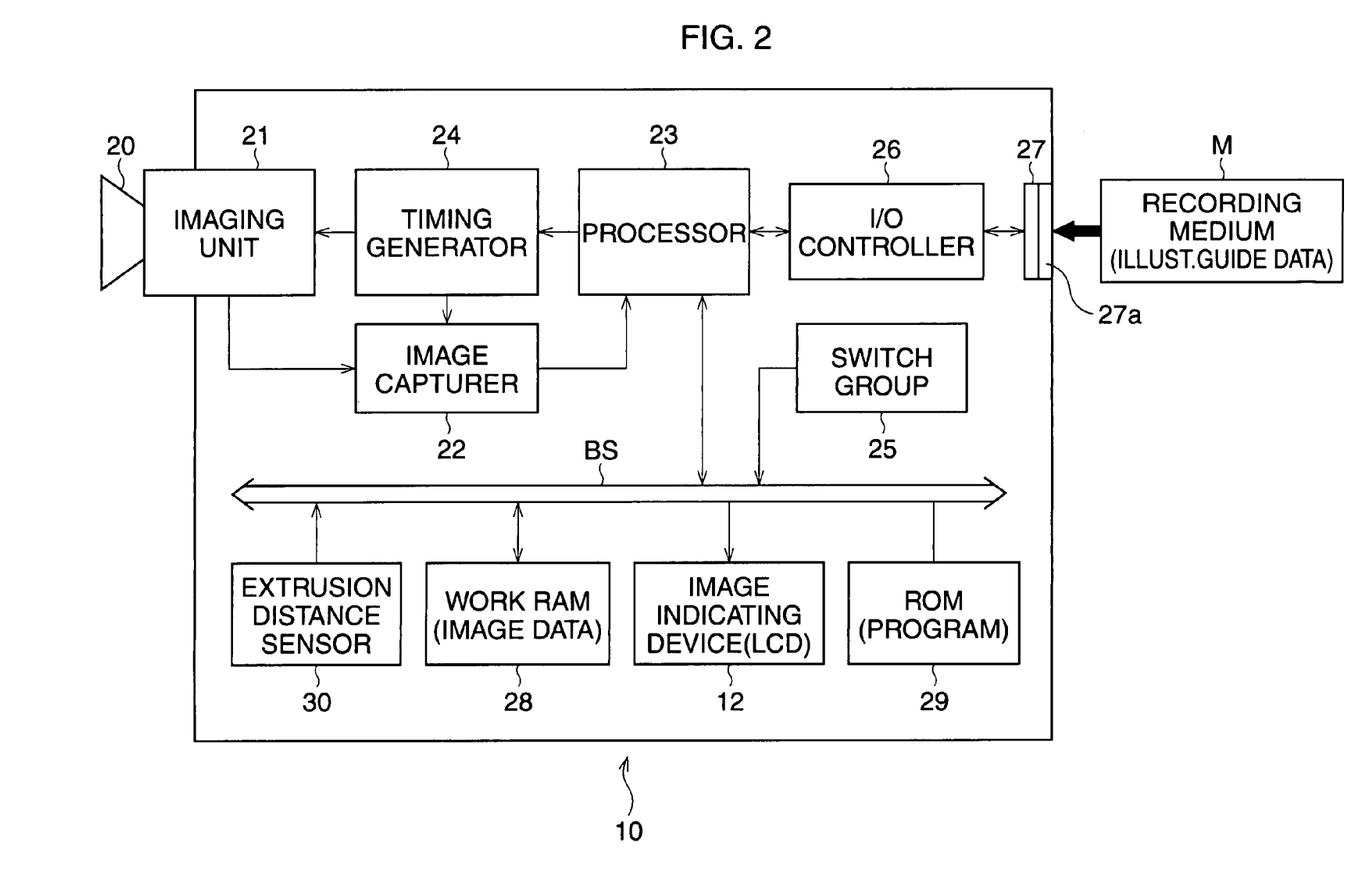
FIG. 2 is a block diagram showing the electric construction of the digital binoculars depicted in FIG. 1.

FIG. 2 is a block diagram showing the electric construction of the digital binoculars 10 depicted in FIG. 1.

Light made incident into a photographing optical system 20 produces an object image on an imaging device, such as a CCD, inside an imaging unit 21 and is converted into image signals. In the imaging unit 21, predetermined signal processes, relating to the imaging device, are carried out. The image signals are then fed to a processor 23 through an image capturer 22.

The image capturer 22 is a circuit that temporally stores image signals (image data) from the imaging unit 21 in accordance with an operation of the release button 14. For example, images currently being captured by the imaging device can be displayed on the image-indicating device 12 as live video. In this case, the image capturer 22 successively outputs resolution reduced image signals, of which the number of pixels is thinned out, to the processor 23. The image signals are then successively fed to the image-indicating device 12 via a bus BS and displayed on a screen of the image-indicating device 12 as live video. When the release button 14 is operated, the current image is temporally stored in a memory (not depicted), for example, without thinning out the data.

The image data stored in the image capturer 22 may be displayed on the image-indicating device 12 as a still image, through the processor 23 and the bus BS. Note that, the imaging unit 21 and the image capturer 22 are controlled based on synchronizing signals form a timing generator 24. The timing generator 24 is controlled by the processor 23. Further, a switch group 25, including the macro-mode switch 31, the release button 14, the menu button 15, the display button 16, the cursor keys 17U, 17D, 17R, 17L, as well as the OK button 18, and an extrusion-distance sensor 30 are connected to the processor 23, for example, via the bus BS.

Note that, the extrusion-distance sensor 30 is a sensor for detecting an extrusion distance, which is a distance of the photographing optical system 20 from a predetermined position (e.g. the position at infinity focus), and which varies in accordance with the rotation of the focusing drive ring 13. Further, in the present embodiment, a plurality of control buttons, such as the cursor keys 17U, 17D, 17R, 17L, the OK button 18, and so on, are provided for setting, selecting, or designating modes, folders, files, and so on. However, any other type of input device(s), a single manually operated member or a plurality of manual operated members, can be used in place of the above-described buttons. For example, the control buttons can be replaced by a single manually operated member which functions in the same way as the cursor keys when it is inclined toward different directions and functions as an OK button when it is depressed.

Further, an I/O controller 26 is connected to the processor 23, and a recording medium controller 27 is connected to the I/O controller 26. The recording medium controller 27 may be provided with a recording medium connecter 27a, for detachably connecting a recording medium M, including an IC memory card, so that the memory capacity, structure of the hierarchical file system, and currently available free storage of the recording medium M is detected. Further, data read/write operations are carried out through the recording medium controller 27. For example, the image data, which is obtained by the image capturing operation and temporally stored in the image capturer 22, is stored in the free storage (available space) of the recording medium M via the processor 23, the I/O controller 26, and the recording medium controller 27. Further, the image data stored in the recording medium M can be transmitted to a work RAM 28 via the recording medium controller 27, the I/O controller 26, the processor 23, and the bus BS. Note that, the processor 23 is driven in accordance with a system program stored in the ROM 29.

With reference to FIGS. 3 to 11C, an illustration-image indicating operation (an illustrated-guide mode) which is carried out by the processor 23 in the embodiment will be explained.

Figure 3:
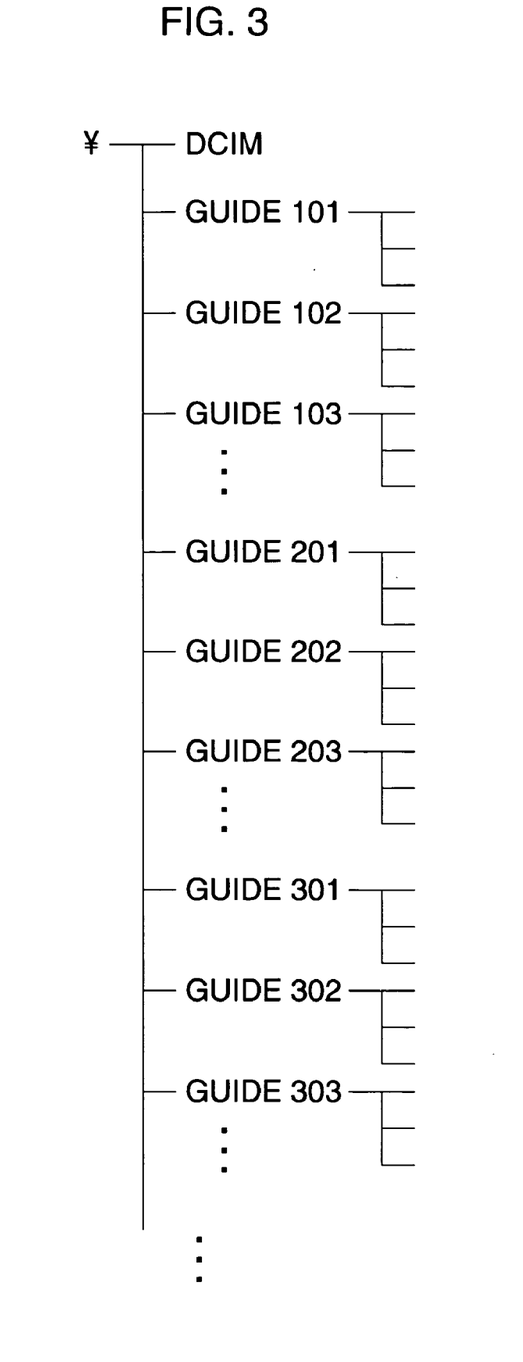
FIG. 3 illustrates folders in the root folder (root directory) of the recording medium.

FIG. 3 depicts an example of a hierarchical structure of folders (directories) in the recording medium M. As shown in FIG. 3, at the root (root directory) of the recording medium M, for example, the folder "DCIM" and a plurality of illustrated-guide folders, such as "GUIDE101", "GUIDE102 , . . . , "GUIDE201", . . . , "GUIDE301", "GUIDE302", . . . , and so on, exist. The folder "DCIM" is a folder for storing still-image files (object images) of image data obtained by the digital camera of the digital binoculars 10. Namely, while the processor 23 is carrying out the typical image capturing processes for a normal digital camera (i.e., before performing the illustration-image indicating operation), the current folder (current directory) is at a certain subfolder under the "DCIM" folder. A captured still-image (object image) is stored in the free storage of the recording medium M (e.g., as JPEG image), as a file in the predetermined subfolder of the "DCIM" folder.

On the other hand, a folder with a name "GUIDE"+"three-digit numeral", such as "GUIDE101", "GUIDE201", "GUIDE301", and so on, correspond to some field of an electronic illustrated guide. For example, the first digit of the "three-digit numeral" corresponds to the average distance to an observation target. In the present embodiment, a folder with a name including a numeral within a first number range (such as 101 to 199 in the embodiment) is assigned to an illustrated guide which relates to a field of which the average distance to an observation target is generally in a far distance range (e.g. more than or equal to 2 m). Further, a folder with a name including a numeral within a second number range different from the first number range (such as 201 to 299 in the embodiment) is assigned to an illustrated guide which relates to a field of which the average distance to an observation target is generally in a medium distance range (e.g. less than 2 m and more than or equal to 40 cm). Furthermore, a folder with a name including a numeral within a third number range different from the other ranges (such as 301 to 399 in the embodiment) is assigned to an illustrated guide which relates to a field of which the average distance to an observation target is generally in a near distance range (e.g. less than 40 cm). For example, the folder "GUIDE101" corresponds to an illustrated bird guide, the folder "GUIDE102" corresponds to an illustrated baseball-player guide, and the folder "GUIDE103" corresponds to an illustrated soccer-player guide. Further, the folder "GUIDE201" corresponds to an illustrate art guide, the folder "GUIDE301" corresponds to an illustrated flower guide, the folder "GUIDE302" corresponds to an illustrated stamp guide, and the folder "GUIDE303" corresponds to an illustrated coin guide. As will be detailed later, in the present embodiment, the distance range of the observation target is presumed based on the extrusion distance of the optical system and ON/OFF-state of the macro-mode switch. The illustrated guides to which a distance range has been assigned and which correspond to the above presumed distance range will be referred to prior to the other guides. Note that, the last two digits of the above three-digit numeral may determine the priority of selection among the illustrated guides included in the same distance range.

Under each of the "GUIDE###" folders, subfolders corresponding to categories relating to the fields of the illustrated guide are hierarchally structured, so that observation targets are hierarchically classified by the subfolders in order to narrow the choice. For example, with reference to FIG. 4, four folders "SPRING", "SUMMER", "AUTUMN", and "WINTER", which correspond to the four seasons, exist under each of the folders "GUIDE101" and "GUIDE201" (which respectively correspond to the illustrated bird guide and the illustrated flower guide). Under the "GUIDE101" folder, folders corresponding to the observation scenes (e.g. habitats) exist, for example, "MOUNTAIN", "SEA", and "TOWN". Similarly, under the "GUIDE201" folder, folders corresponding to the observation scenes also exist, for example, "MOUNTAIN", "MARSH", and "TOWN". Furthermore, folders corresponding to the size of the bird or the flower, such as the "LARGE", "MEDIUM", and "SMALL" exist under the folders corresponding to the observation scenes, such as "MOUNTAIN", "SEA", "TOWN", and "MARSH". Note that, in FIG. 3, only the folders "MOUNTAIN", "SEA"/"MARSH", and "TOWN" of the "SPRING" and only the folders "LARGE", "MEDIUM", and "SMALL" of the "MOUNTAIN" are illustrated, and the other subfolders are neglected for convenience.

The illustration-image files of birds that are classified in accordance with the above seasons, scenes, and sizes, and the files including the information relating to these illustration-image files are stored in the "LARGE", "MEDIUM", and "SMALL" folders, which exist under the respective seasons and scenes of the "GUIDE101" folder. Similarly, the illustration image files of flowers that are classified in accordance with the above seasons, scenes, and sizes, and files including information relating to these illustration image files are stored in the "LARGE", "MEDIUM", and "SMALL" folders, which exist under the respective seasons and scenes of the "GUIDE201" folder. This is true for the other illustrated-guide folders. In the following, explanation is merely made for the illustrated bird guide, as a representative guide.

Figure 5:
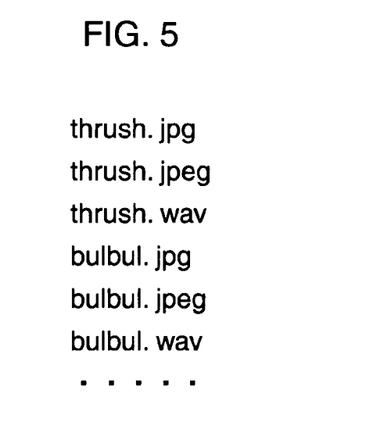
FIG. 5 is an example of files stored in the folder "\GUIDE101\AUTUMN\TOWN\SMALL.

In FIG. 5, files stored in the folder "\GUIDE101\AUTUMN\TOWN\SMALL" are listed as examples. For example, the file "thrush.jpg" is an illustration image file of a thrush, and the file "thrush.jpeg" is an illustration image file with character information (including marks, symbols, and the like), such as the name of a bird and the like. Namely, "thrush.jpeg" is a composition of the "thrush.jpg" and the image information. Further, "thrush.wav" is voice data of the thrush.

Figure 6:
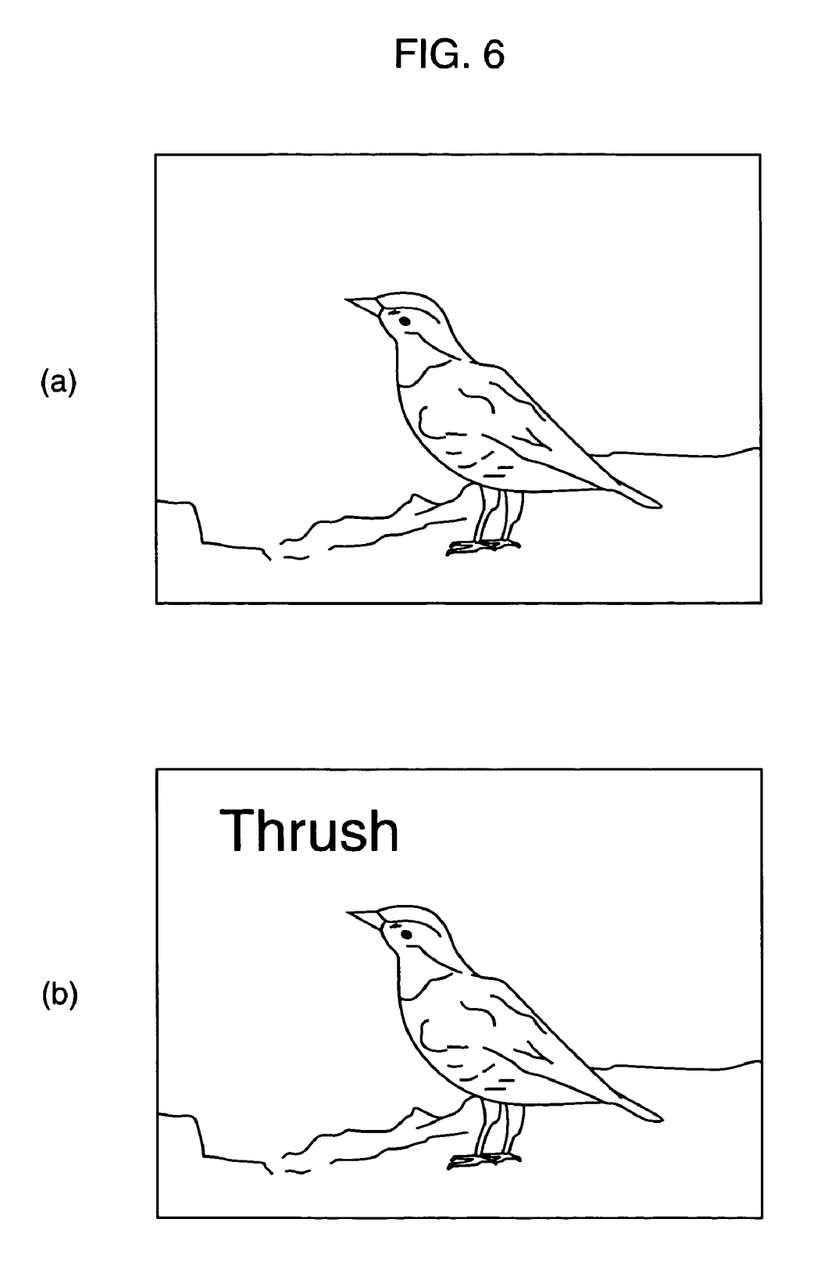
FIG. 6 illustrates examples of the files "thrush.jpg" and "the "thrush.jpeg"

FIG. 6 represents examples of the files "thrush.jpg" and "thrush.jpeg". The "thrush.jpg" file is illustrated at (a) and the "thrush.jpeg" is illustrated at (b). Note that, although only the files relating to the thrush and the bulbul are listed in FIG. 5, many other image files and corresponding voice files relating to various small birds that can be found in towns during autumn can be stored in the folder "\GUIDE101\AUTUMN\TOWN\SMALL". Further, a file that relates to birds which can be seen during all seasons or in a plurality of places, e.g. both towns and mountains, is stored in all folders that meet the conditions.

Figure 7:
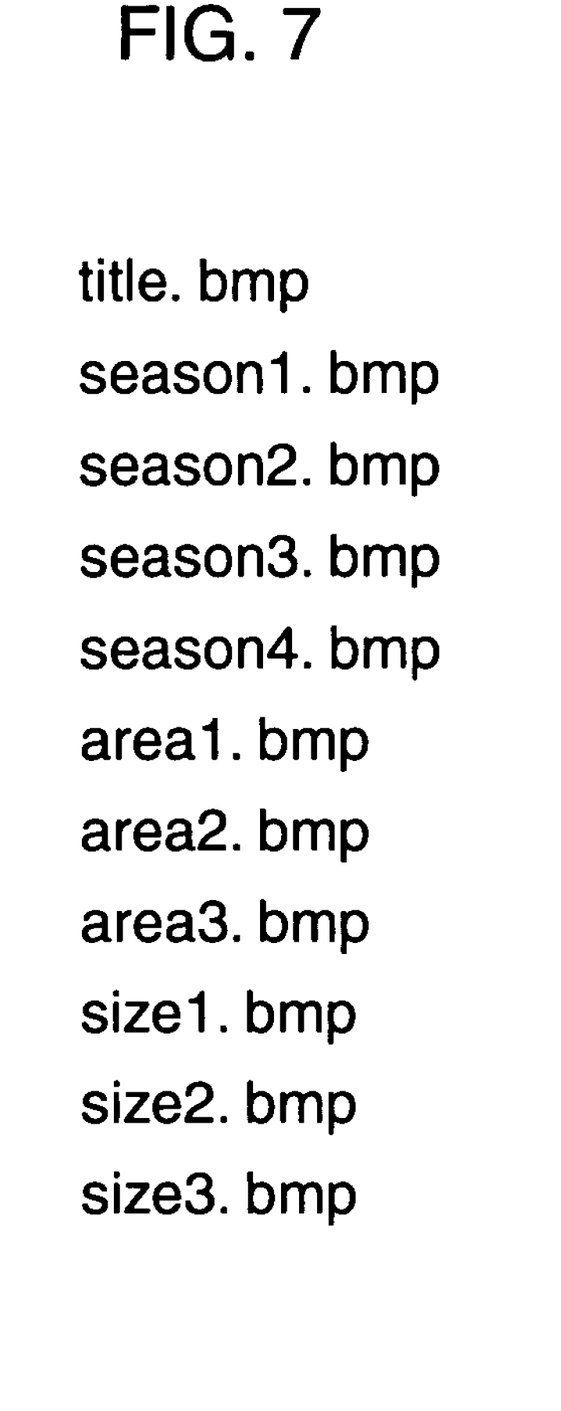
FIG. 7 is an example of the image files (folder-images) which are stored in the illustrated-guide folders.

On the other hand, image files (folder-images), such as bitmap data as listed in FIG. 7, are stored in the folder "GUIDE101". The folder-image files "area1.bmp", "area2.bmp", and "area3.bmp" correspond to the respective folders "MOUNTAIN", "SEA", and "TOWN" and the folder-image files "season1.bmp", "season2.bmp", "season3.bmp", and "season4.bmp" correspond to the respective folders "SPRING", "SUMMER", "AUTUMN", and "WINTER". Further, the folder-image files "size1.bmp", "size2.bmp", and "size3.bmp" correspond to the respective folders "LARGE", "MEDIUM", and "SMALL" and the folder-image file "title.bmp" corresponds to the folder "GUIDE101", i.e. the illustrated bird guide.

As described above, the above-mentioned image files are stored in the folder "GUIDE101". This is true with the folder "GUIDE201" of the illustrated flower guide and the other illustrated-guide folders, which are characterized by the folder name with "GUIDE" on the head. Note that, for the illustrated-guide folders corresponding to the illustrated guides for sport players, such as baseball players and the soccer players, a team name, nationality, and so on, can be adopted as categories for the classification. Further, for the illustrated-guide folders corresponding to the illustrated guides for the stamps and the coins, a name of the country, year of issue, and so on, can be adopted as the categories for the classification.

Figure 8:
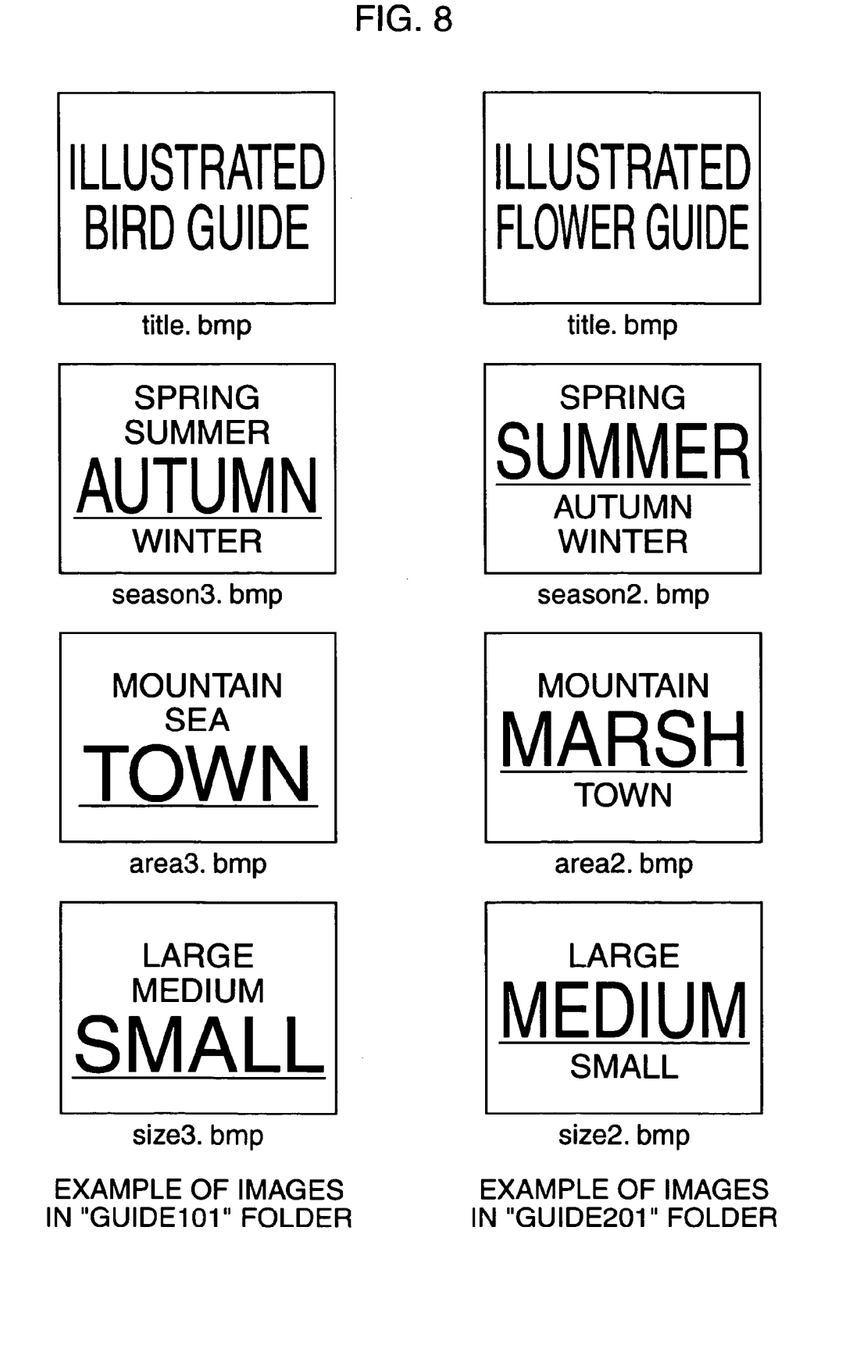
FIG. 8 depicts an example of the bitmap images stored in the folders "GUIDE101" and "GUIDE201"

In FIG. 8, examples of the bitmap images stored in the folders "GUIDE101" and "GUIDE201" are depicted. In the left column, the folder-images of the "title.bmp" (ILLUSTRATED BIRD GUIDE), "season3.bmp" (AUTUMN), "area3.bmp" (TOWN), and "size3.bmp" (SMALL), allocated in the folder "GUIDE101" of the illustrated bird guide, are illustrated (the same as those in FIG. 7). Further, in the right column, the folder-images of the "title.bmp" (ILLUSTRATED FLOWER GUIDE), "season2.bmp" (SUMMER), "area2.bmp" (MARSH), and "size2.bmp" (MEDIUM), allocated in the folder "GUIDE201" of the illustrated flower guide, are illustrated. Note that, the size of the bitmap files (BMP files) stored in the above "GUIDE101" and "GUIDE201 folders and the JPEG image files of the birds is substantially small compared to the still images (object image) that are obtained by the imaging device, since resolution of the above folder-images and illustration-images is merely required to satisfy the resolution of the image-indicating device 12. Therefore, sufficient free storage or available space for storing object-images can be secured in the recording medium M.

Note that, in the present embodiment, an illustration-image file with the "jpeg" extension (a composite image of a bird or flower image and character information) is provided in addition to a plain illustration-image file of a bird or flower with a "jpg" extension. The images of files that have the same base file name (such as "thrush" and so on) but different extensions, "jpg" and "jpeg", can be alternately displayed according to an operation of a user, so that superimposition of the character information onto the illustration image of a bird or flower can be simply emulated. Thereby, both character information and an illustration image can be easily viewed and recognized.

Figure 9A:
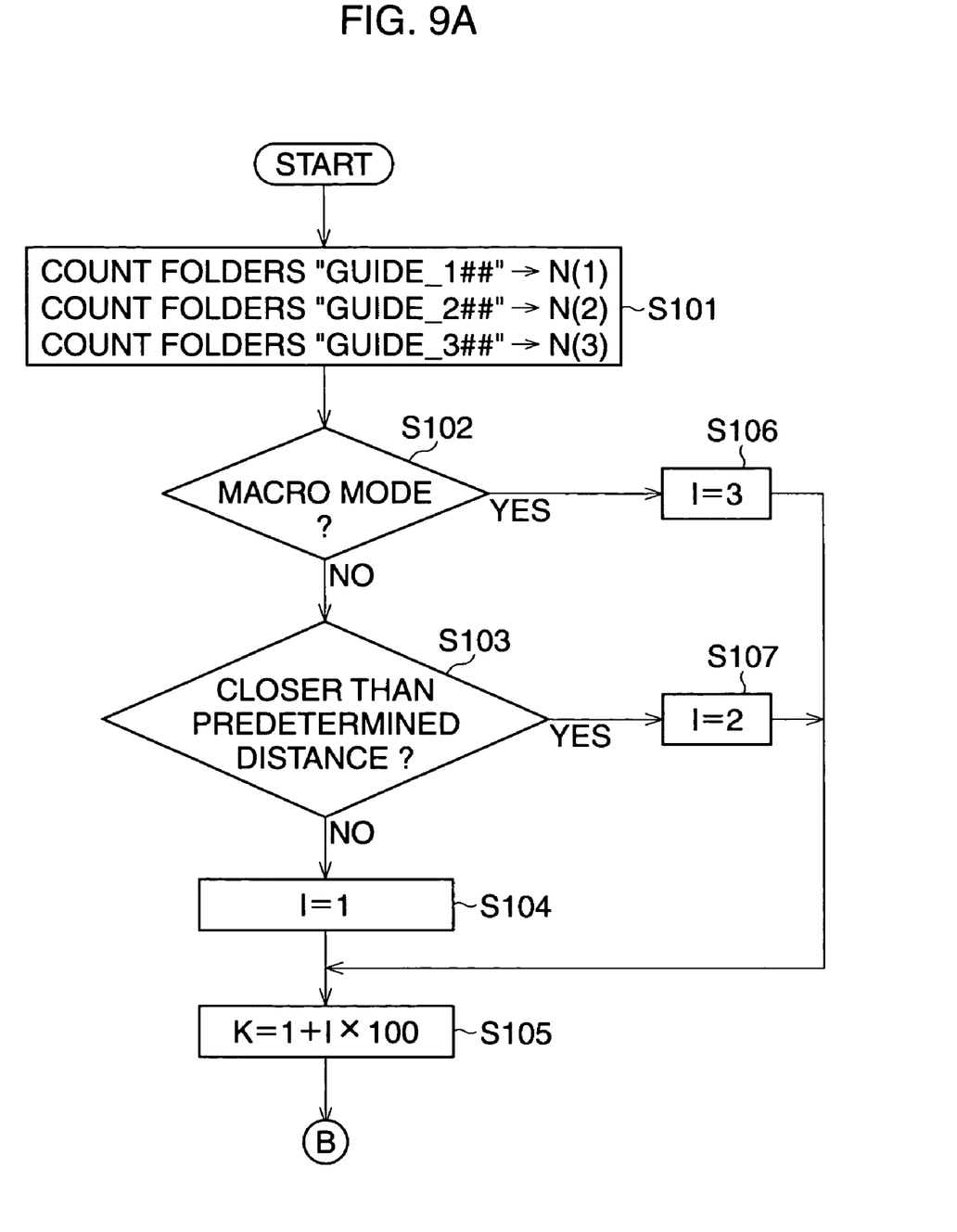
FIGS. 9A to 9C are flowcharts of the illustration-image indicating operation (the illustrated-guide mode) of the embodiment.
Figure 9B:
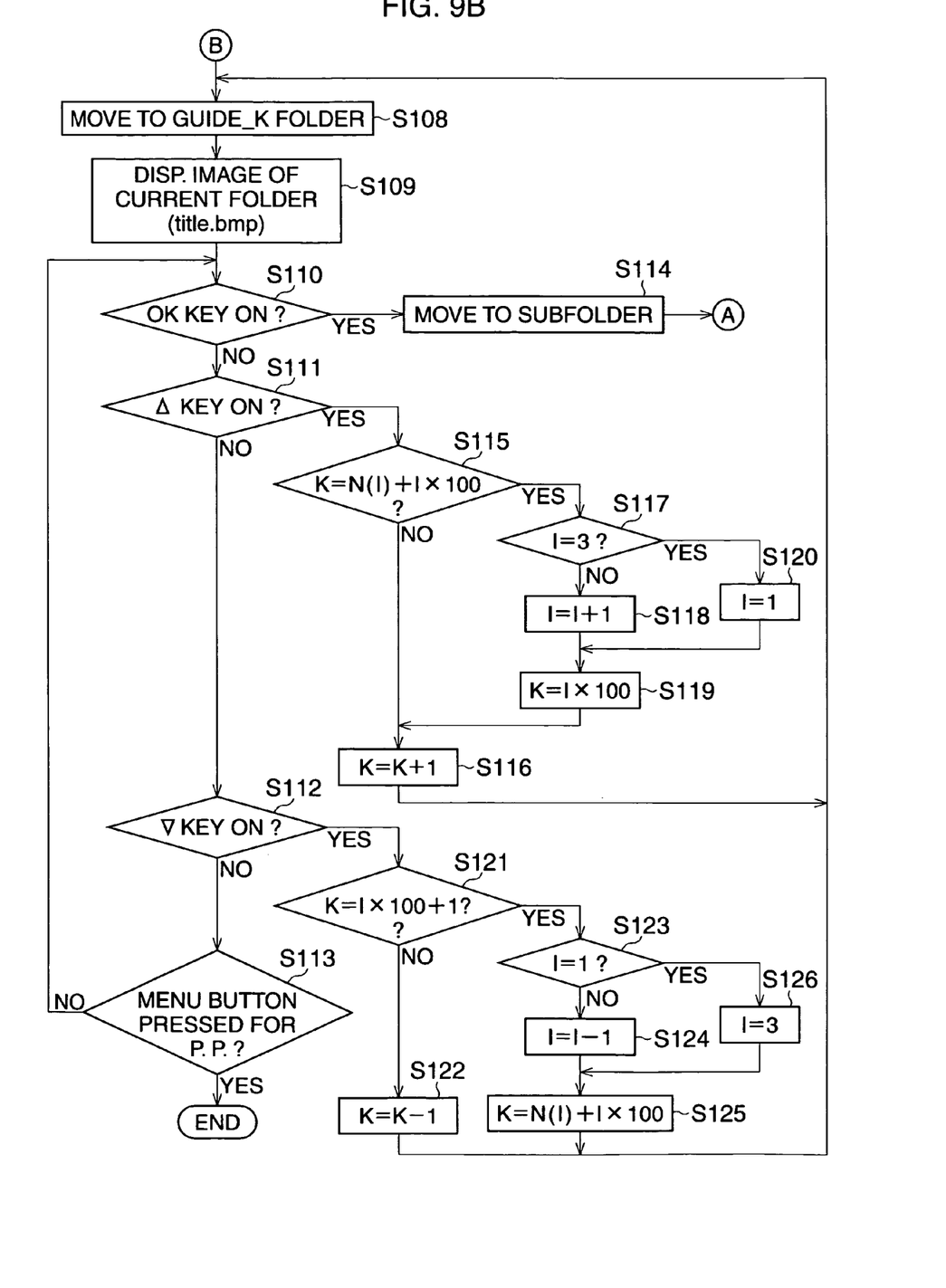
Figure 9C:
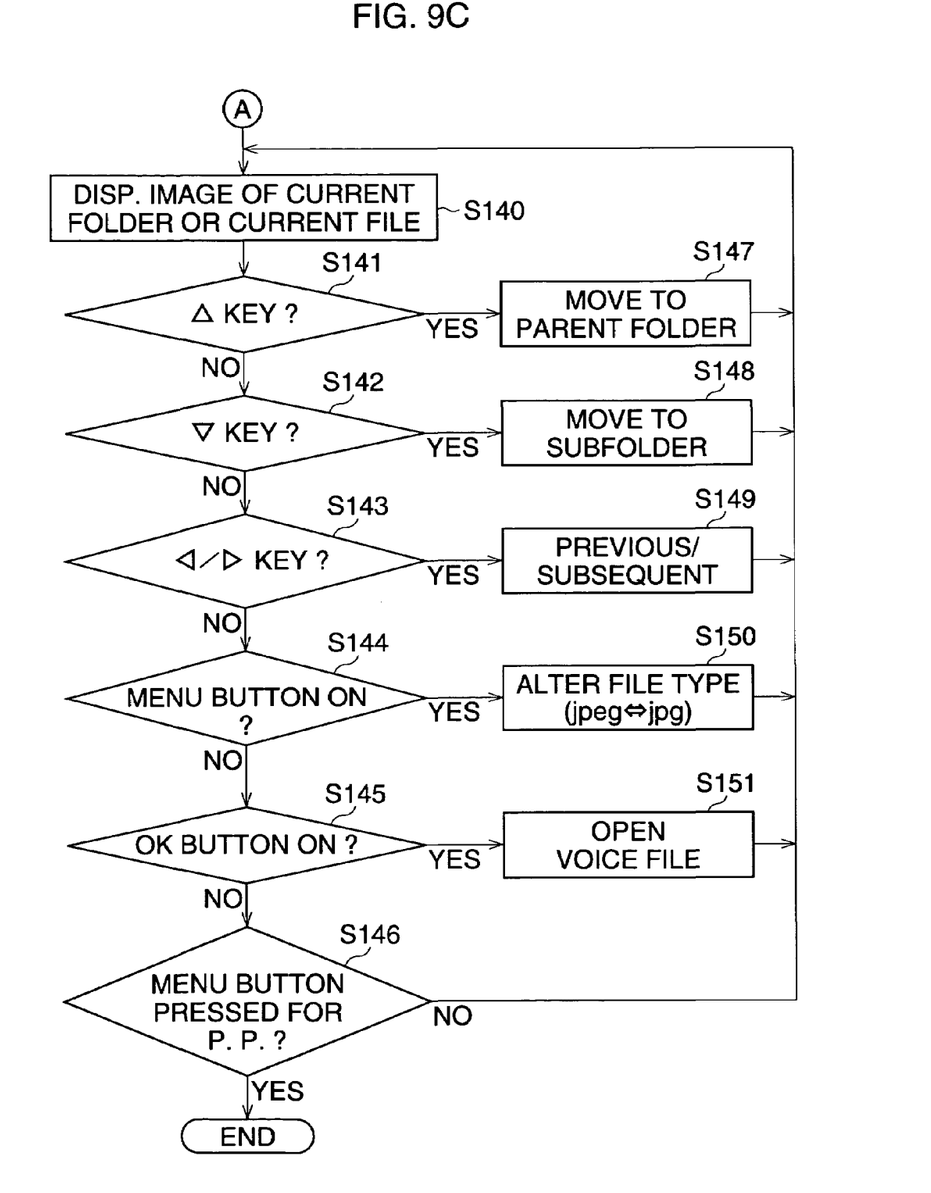

FIGS. 9A to 9C are a flowchart of the illustration-image indicating operation (the illustrated-guide mode) of the present embodiment. For example, this illustration-image indicating operation or the illustrated-guide mode starts when the menu button 15 is pressed for a predetermined period of time (longer than the normal press). This may be carried out by an interrupt routine. Note that, before the illustrated-guide mode is selected and the illustration-image indicating operation is carried out, the processor 23 executes the operations that are required to carry out the functions of a normal digital camera (digital camera mode).

In Step S101, the current folder is at the root folder of the recording medium M, and folders with a name in the first number range (which corresponds to the far distance range), with a name in the second number range (which corresponds to the medium distance range), and with a name in the third number range (which corresponds to the near distance range), such as "GUIDE1##", "GUIDE2##", and "GUIDE3##", are searched, so that the number of folders for the far, medium, and near distance ranges is detected and stored as the respective variables N(1), N(2), and N(3). Note that, in the present embodiment, the variables N(1), N(2), and N(3) are all two-digit numbers, since the numerals included in the folder names are all three-digit numerals.

In Step S102, whether the macro-mode (which is used to shoot an object in the near distance range, e.g. closer than 40 cm) is selected by the macro-mode switch 31 is determined. When it is determined that the macro-mode is not selected, in Step S103, the distance to the observation target is estimated from the extrusion distance of the focusing lens (not depicted) and the focal length of the photographing optical system 20. Note that, the extrusion distance, which is detected by the extrusion distance sensor 30, is measured from the position at infinity focus and the focusing lens is part of the photographing optical system 20. Further, whether the estimated distance to the observation target is closer than a predetermined distance, which defines the boundary of the far distance range and the medium distance range (e.g. 2 m), is determined. When the estimated distance to the observation target is not closer than the predetermined distance, the value of variable "I" is set to 1 in Step S104 and the value of variable "K" is set to K=1+I×100 in Step S105.

Note that, the variable "I" represents the index number of the variable N(I), in other words the first numeral of the three-digit number of the folder name, so that I=1, 2, or 3, where N(I) describes the number of folders for the respective far, medium, and near distance ranges. Further, the variable K indicates the three-digit numeral of the currently selected folder "GUIDE###". Note that, hereinafter, an illustrated-guide folder of which the last three characters correspond to the variable "K", will be referred to as "GUIDE_K".

On the other hand, when it is determined, in Step S102, that the macro-mode is selected by the macro-mode switch 31, the value of the variable "I" is set to 3 in Step S106. Further, when the estimated distance to the observation target is determined, in Step S103, to be closer than the predetermined distance (i.e. medium distance range), the value of a variable "I" is set to 2 in Step S107. Namely, when the macro-mode is selected by the macro-mode switch 31, the value of the variable "K" is initialized to 301. Further, when the macro-mode is not selected and when the distance to the observation target is estimated to be in the medium distance range, the value of the variable "K" is initialized to 201. Other than these two cases, the distance to the observation target is estimated as in the far distance range and the value of the variable "K" is initialized to 101.

In Step S108, the current folder is changed to the folder "GUIDE_K". For example, when the macro-mode is OFF and when the distance to the observation target is 10 m, the value of the variable "K" is set to 101, so that the current folder is changed to the folder "GUIDE101", which corresponds to the illustrated bird guide. Further, when the macro-mode is ON, the variable "K" is set to 301 and the current folder is changed to the folder "GUIDE301", which corresponds to the illustrated flower guide. Further, in Step S109, the image of the bitmap data "title.bmp" which corresponds to the current folder "GUIDE_K" is displayed on the image-indicating device 12.

In Steps S110 to S113, whether the OK button 18, the up-key 17U, the down-key 17D, and the menu button 15 are pressed is determined, in this order, and respective processes are executed according to an operation. Namely, in Step S110, whether the OK button is pressed is determined, in Step S111, whether the up-key 17U is pressed is determined, and in Step S112, whether the down-key 17D is pressed is determined. Further, in Step S113, whether the menu button 15 is pressed for the predetermined period is determined.

When it is determined, in Step S110, that the OK button 18 is pressed, the current folder is changed to a subfolder in Step S114, so that the current folder is changed to the subfolder of the current folder "GUIDE_K", and the processes that follows Step S140 will be carried out (detailed later). In Step S111, whether the up-key 17U is pressed is determined. When the up-key 17U is pressed, whether the value of K=N(I)+I×100 is determined in Step S115. Namely, whether the value of the variable "K" corresponds to a folder with a name having the maximum number among the folders where the first numeral of the three-digit number is "I", is determined. When K is not equal to N(I)+I×100, in Step S116, the value of the variable K is incremented by 1 and the process returns to Step S108. Namely, the current folder is changed from the folder "GUIDE_K" to the folder "GUIDE_K+1".

On the other hand, when it is determined, in Step S115, that K=N(I)+I×100, whether I=3 is determined in Step S117. When "I" is not equal to 3, the value of the variable "I" is incremented by 1 in Step S118 and the value of the variable "K" is set to I×100 in Step S119. Further, in Step S116, the variable "K" is incremented by 1, and then, in Step S108, the current folder is changed to the folder with the new value "K". For example, when N(1)=23 and K=123, the current folder is changed from the folder "GUIDE123" to the folder "GUIDE201". Further, when it is determined that I=3, in Step S117, the value of the variable "I" is reset to 1 in Step S120 and the process proceeds to Step S119. For example, when N(3)=34 and K=334, the current folder is changed from the folder "GUIDE334" to the folder "GUIDE101".

In Step S112, whether the down-key 17D has been pressed is determined. When the down-key 17D is pressed, whether K=1+I×100 is determined in Step S121. Namely, whether the value of the variable "K" corresponds to the folder of which the name having the minimum number among the folders with the first numeral of the three-digit number is "I" is determined. When variable "K" is not equal to 1+I×100, the value of the variable "K" is decremented by 1 in Step S122 and the process returns to Step S108. Namely, the current folder is changed from the folder "GUIDE_K" to the folder "GUIDE_K−1".

On the other hand, when it is determined, in Step S121, that K=1+I×100, whether I=1 is determined in Step S123. When "I" is not equal to 1, the value of the variable "I" is decremented by 1 in Step S124, and then the value of the variable "K" is set to N(I)+I×100. Further, the process returns to Step S108 so that the current folder is changed to the folder with the new value "K". For example, when N(2)=24 and K=301, the current folder is changed from the folder "GUIDE301" to the folder "GUIDE224". Further, when it is determined in Step S123 that I=1, the value of the variable "I" is set to 3, in Step S126, and the process proceeds to Step S125. Namely, when N(3)=34 and K=101, the current folder is changed from the folder "GUIDE101" to the folder "GUIDE334".

In Step S113, whether the menu button 15 has been pressed for the predetermined period is determined. When the menu button 15 has not been pressed for the predetermined period, the process returns to Step S110 and the succeeding processes are repeated. On the other hand, when the menu button 15 has been pressed for the predetermined period, this illustration-image indicating operation (the illustrated-guide mode) ends, so that the process returns to the processes for a normal digital operation. Note that, the processes form Step S110 to Step S113 are repeated until one of the up-key 17U, down-key 17d, or OK button 18 is pressed or until the menu button 15 is pressed for the predetermined period.

Figure 4:
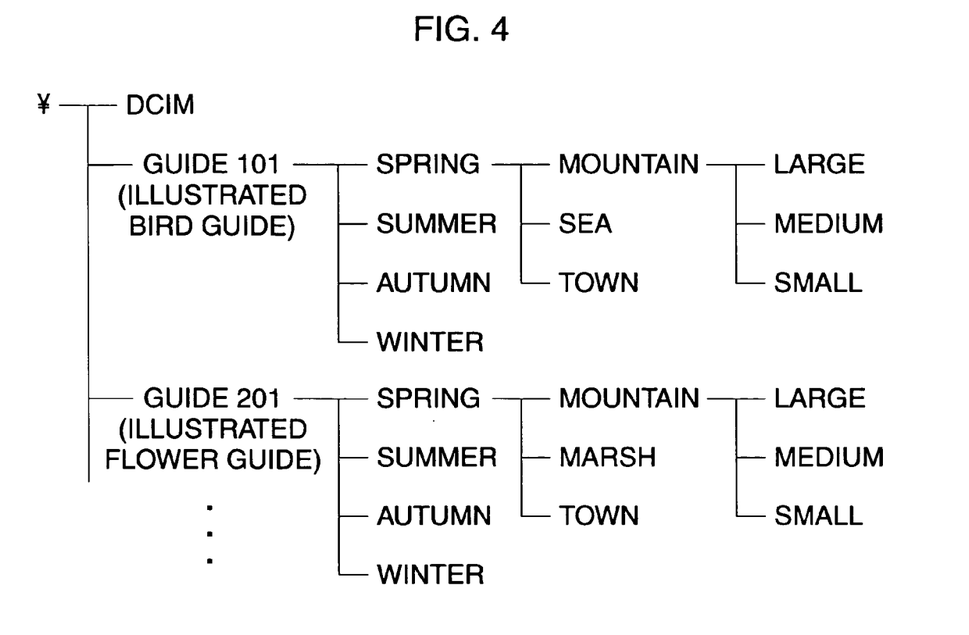
FIG. 4 illustrates an example of a hierarchical structure of folders (directories) in the recording medium.

Next, the processes that follows Step S140 will be explained, that is what happens when the OK button 18 is pressed and when the folder "GUIDE_K" is selected as the current folder. In the following explanation, the folder "GUIDE101", which is the illustrated bird guide, is selected as an example. Namely, it corresponds to the occasion when the OK button 18 is pressed when the current folder is at "GUIDE101" in Step S109 and the "title.bmp" of the illustrated bird guide is displayed on the image-indicating device 12. As shown in FIG. 4, the folder "GUIDE101" has four subfolders "SPRING". "SUMMER", "AUTUMN", and "WINTER". In Step S114, the current folder is changed to the first searched subfolder among the above-four folders. For example, when the search of the subfolders is carried out in the order listed in FIG. 4, the folder "SPRING" is searched first, so that the current folder is changed to the folder "SPRING" in Step S114. In Step S140, the image corresponding to the current folder or the current file (when the file is selected) is displayed on the image-indicating device 12. Since the current folder is "SPRING", just after Step S114 has been carried out, the image of the "season1.bmp" which corresponds to the current folder is displayed on the image-indicating device 12.

In Steps S141 to S146, whether one of the cursor keys 17U, 17D, 17R, and 17L, the menu button 15, or the OK button 18 has been operated is determined, so that the processes corresponding to the respective operations are carried out (Step S147–S151). Namely, in Step S141, whether the up-key 17U has been pressed is determined and in Step S142, whether the down-key 17D has been pressed is determined. Further, in Step S143, whether the right-key 17R or the left-key 17L has been pressed is determined. Furthermore, whether the menu button 15 has been pressed and whether the OK button 18 has been pressed is determined in Steps S144 and S145, respectively, and in Step S146, whether the menu button 15 is pressed for the predetermined period has been determined.

When it is determined in Step S141 that the up-key 17U has been pressed, the current folder is changed to the parent folder in Step S147. The process then returns to Step S140 and the image corresponding to the new current folder is displayed on the screen of the image-indicating device 12. For example, when the up-key 17U is pressed when the current folder is at "\GUIDE101\AUTUMN\TOWN" and when the corresponding image, such as the third image of the left column of FIG. 8, is displayed on the image-indicating device 12, the current folder is changed to "\GUIDE101\AUTUMN" and the second image of the left column of FIG. 8 is then displayed on the image-indicating device 12. However, when the parent is the root folder, the current folder will not be changed.

When it is determined, in Step S142, that the down-key 17D is pressed, subfolders of the current folder are searched and the current folder is changed to the first folder that was found in the above search. Further, if no subfolder is found, the first found illustration-image file is selected. Note that, it is preset to select a "*.jpg" file by default.

When a subfolder or a file is selected in Step S148, the image corresponding to the selected folder or file is displayed in Step S140. For example, if the down-key 17D is pressed when the current folder is at "\GUIDE101\AUTUMN\TOWN", the subfolder "LARGE" is firstly found and the corresponding image, i.e. the file "size1.bmp", is displayed on the image-indicating device 12. Further, if the down-key 17D is pressed when the current folder is at "\GUIDE101\AUTUMN\TOWN\SMALL", the JPEG files "*.jpg" are searched, since the current folder has no subfolder. For example, when the file "thrush.jpg" is firstly found, the image shown in (a) of FIG. 6 is displayed on the image-indicating device 12.

When it is determined, in Step S143, that the right-key 17R or the left-key 17L is pressed, a previous or subsequent folder (or file) is searched in Step S149. For example, when the left-key 17L is pressed, the previous folder (or file) is searched and when the right-key 17R is pressed, the subsequent folder (or file) is searched. If the right-key 17R is pressed when the current folder is at "\GUIDE101\AUTUMN\MOUNTAIN", the current folder is changed to "\GUIDE101\AUTUMN\SEA", for example. The process then returns to Step S140, such that the image that corresponds to the "\GUIDE101\AUTUMN\SEA" is displayed. Note that, the alteration of the current folder due to the right-key 17R is carried out cyclically in the following order, "MOUNTAIN"→"SEA"→"TOWN"→"MOUNTAIN" and the alteration due to the left-key 17L is cyclically carried out in the opposite order. Further, the same is true with the file selection, so that the selection of a file is cyclically altered by operations of the right-key 17R and the left-key 17L and the image of the selected file is displayed on the image-indicating device 12.

When it is determined, in Step S144, that the menu button 15 is pressed, the type of the file that is adopted when selecting a file in Step S148 and Step S149 is altered in Step S150 and the process returns to Step S140. Namely, by default, a file with the extension "jpg" (file "*.jpg") is subjected to the file selection. However, when the menu button 15 is pressed, the subject of the file selection is altered to a file with the extension "jpeg" (file "*.jpeg"). Further, when the menu button 15 is pressed while a "*.jpeg" file is being selected, the file selection is altered to the "*.jpg" files. For example, if the menu button 15 is pressed while the file "thrush.jpg" is being selected and the illustration-image, such as (a) of FIG. 6, is displayed, the file selection will be altered to the "thrush.jpeg", so that the image shown at (b) of FIG. 6 will be displayed on the image-indicating device 12.

When it is determined that the OK button 18 has been pressed, in Step S145, a voice file corresponding to the selected file is opened in Step S151, so that the song of the bird, which is displayed on the image-indicating device 12, is output from the speaker 30 (see FIG. 2) and the process returns to Step S140. For example, if the OK button 18 is pressed when the file "thrush.jpg" is selected, the song of the thrush, which is recorded in the "thrush.wav" is played. Note that, nothing will happen in this step when no file is selected.

When it is determined, in Step S146, that the menu button 15 has been pressed for the predetermined period, this illustration-image indicating operation ends, and the process returns to the operations that are required to achieve functions of a normal digital camera. When none of the cursor keys 17U, 17D, 17R, and 17L, the menu button 15, or the OK button 18 is pressed, the process returns to Step S140 and the above-described processes are repeated.

Note that, the correspondence between the folders and the folder-image files may be established by the order of the folders and files or by establishing correspondence between the folder names and the file names.

As described above, in the present embodiment, objects or targets of an observation, such as the bird in the embodiment, are classified based on various attributes and each category is hierarchally combined as a hierarchal folder system. Further, files that store information relating to the observation targets, including illustration-image files and voice files of the illustrated-guide data, are stored in the recording medium based on the above hierarchal classification. Thereby, the illustration image files which relate to the observation targets can be easily and swiftly searched along the hierarchal classification, by a user, so that the searched illustration image can be displayed on the image-indicating device of the digital binoculars for reference. Therefore, the image of an object that is being observed can be easily compared to the above searched illustration image. Further, the information relating to an illustration image, such as voice, name, and the like, can also easily be cited in the present embodiment. This also helps identification of the observation target. Further, in the present embodiment, even when a plurality of illustrated-guides exist in a recording medium, an illustrated-guide which has a large possibility of containing the necessary information to be referred to, is given priority in the selection, based on the distance relating information detected for each of the observation targets, so that the required illustrated-guide can be easily selected.

Furthermore, since the observation target is classified by the hierarchical structure of folders (directories), the above search system can be constructed by using a significantly simple structure, so that users can easily construct a database by theirselves.

In the present embodiment, the folder-images, which represent the respective folders, are all allocated in the illustrated-guide folder. However, the folder-images can be allocated in each corresponding folder separately. Further, in the first embodiment, JPEG and BMP files are adopted as the image files and WAV files are adopted as the voice files. However, any suitable type of image file and voice file can be adopted.

In the first embodiment, although the illustration-image indicating operation is carried out in the digital binoculars, the operation can be carried in the digital camera. Further, the distance-detecting sensor other than the extrusion distance sensor, can also be used to detect the distance to the observation target. Further, although in the present embodiment, a tree-digit numeral is attached to the last part of the folder name (directory name), a two-digit numeral, a four-digit, or a larger than four-digit numeral can also be adopted, and further the numeral can be placed in any part of the name. Further, characters that are put in order by a certain regulation, other than the numeral, can be also used to determine the distance range and the selection priority. Furthermore, in the present embodiment, the information that relates to the distance range and the selection priority is incorporated in the folder name, however, this information can be stored in the recording medium as a table in a file.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-312144 (filed on Sep. 4, 2003), which is expressly incorporated herein, by reference, in its entirety.

The invention claimed is:

1. An optical apparatus, comprising:
    a recording medium that stores electronic illustrated guidebook data for a plurality of electronic illustrated guidebooks;
    a distance-detecting sensor that detects distance information relating to an observation target;
    an illustrated guidebook selector that selects one electronic illustrated guidebook from said plurality of illustrated guidebooks in accordance with the distance information; and
    an image-indicating device that displays information of said illustrated-guidebook data.

2. The optical apparatus according to claim 1, wherein said recording medium comprises a hierarchal folder system where the observation target is classified in categories based on predetermined attributes and where said categories are hierarchally combined as folders, and wherein the uppermost categories correspond to each of said plurality of illustrated guidebooks.

3. The optical apparatus according to claim 2, wherein illustration-image files of said illustrated-guidebook data, which comprises image data relating to the observation target, are allocated in the lowest subfolders.

4. The optical apparatus according to claim 2, wherein said recording medium stores folder-image files that comprise image data representing said categories which correspond to each of said folders.

5. The optical apparatus according to claim 2, wherein a name of said illustrated-guidebook folder comprises characters relating to the distance information.

6. The optical apparatus according to claim 5, wherein said characters relating to the distance information comprise a predetermined number of digits.

7. The optical apparatus according to claim 5, wherein said plurality of illustrated guidebooks is grouped based on a plurality of distance ranges where the observation target is presumed to be included, so that said illustrated-guidebook selector selects an illustrated guidebook in a group corresponding to a distance range where the observation target is detected.

8. The optical apparatus according to claim 1, wherein said plurality of illustrated guidebooks is grouped based on a plurality of distance ranges where the observation target is presumed to be included, so that said illustrated-guidebook selector selects an illustrated guidebook in a group corresponding to a distance range where the observation target is detected.

9. The optical apparatus according to claim 1, wherein said distance-detecting sensor detects the distance information in accordance with an extrusion distance of an optical system.

10. The optical apparatus according to claim 5, wherein said characters represent a priority of selecting one of said plurality of illustrated guidebooks.

11. The optical apparatus according to claim 1, wherein the distance information comprises information relating to selection of a macro-mode.

12. A recording medium, comprising:
    electronic illustrated-guidebook data that correspond to a plurality of electronic illustrated guidebooks; and
    information that defines the order of priority of selecting one of said plurality of electronic illustrated guidebooks, when said plurality of electronic illustrated-guidebooks is referred to.

* * * * *